Jan. 10, 1933.   F. S. MARCELLUS   1,894,111
LIGHT BEAM INSTRUMENT
Filed Sept. 23, 1932
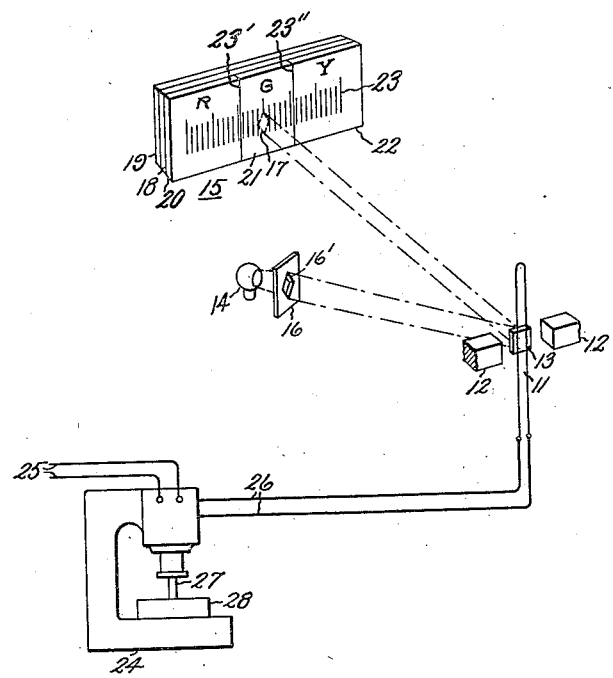
Inventor:
Fredrick S. Marcellus,
by Charles E. Tullar
His Attorney Patented Jan. 10, 1933

1,894,111

UNITED STATES PATENT OFFICE

FREDRICK S. MARCELLUS, OF SCOTIA, NEW YORK, ASSIGNOR TO GENERAL ELECTRIC COMPANY, A CORPORATION OF NEW YORK

LIGHT BEAM INSTRUMENT

Application filed September 23, 1932. Serial No. 634,526.

My invention relates to indicating instruments and concerns particularly instruments of the light-beam type.

It is an object of my invention to provide a compact, sensitive and easily read instrument which responds quickly and follows faithfully variations in a measured quantity which may fluctuate rapidly.

Another object of my invention is to provide an instrument by means of which a determination of whether or not a measured value falls within a given range may be made without the necessity of observing a scale reading. Other and further objects and advantages will become apparent as the description proceeds.

In accordance with my invention in its preferred form, I may utilize in an instrument any suitable type of movable element to which a mirror may be attached. A translucent screen and a source of light for projecting a beam upon the mirror from which the beam is reflected upon the screen, are also provided. Preferably, the screen comprises a plate of opal glass having successively adjacent portions of the surface toward the light beam covered with color filters having different colors. The opal glass plate may, if desired, have a scale marked thereon. However, variations in the measured quantity from one range of values to the next are indicated by the fact that the light spot projected upon the screen changes in color as the light beam moves from the portion covered by one color filter to that covered by the next color filter. The features of my invention which I believe to be novel and patentable will be pointed out in the claims appended thereto.

For a better understanding of my invention reference may be had to the following description taken in connection with the accompanying drawing which shows a diagrammatic view of the device.

It will be understood that my invention is applicable to any type of indicating instrument. However, for the sake of illustration I have shown its application to an electrical instrument in which a current conducting moving element 11 cooperates with stationary field producing elements 12. Movable element 11 carries a mirror 13 which is angularly deflected with variations in the magnitude of the quantity being measured. A suitable light source 14 is provided which projects light upon the mirror 13 from which it is reflected to a screen 15. Preferably, an opaque screen 16 having a suitably shaped opening therein, for example, a diamond-shaped opening 16', is interposed between the light source 14 and the mirror 13 for the purpose of forming a definitely shaped luminous image which may be projected upon the screen 15 to form a diamond-shaped spot of light 17.

The screen 15 comprises a translucent plate 18 which may, if desired, be covered by a clear glass plate 19. Although a visible spot of light 17 will be produced if the translucent plate 18 comprises a sheet of ground glass, I have found that considerably better results may be obtained by utilizing opal glass for the translucent plate 18. The use of opal glass not only causes the spot of light to become more brilliant, definite and easily seen, but it also causes the spot of light to become visible when observed from any angle instead of merely being visible when observed from a direction perpendicular to the surface of the indicating screen 15.

The superiority of opal glass over ground glass probably results both from the relatively great efficiency of light transmission which may be obtained from opal glass and from the difference in the physical nature of opal glass. Opal glass may be regarded as having a large number of fine white particles in suspension. The rays of light striking these particles are dispersed in all directions. Consequently not only is the light beam diffused by the opal glass, but the illuminated portion of the opal glass itself becomes luminous throughout its thickness and transmits light in every direction. Great thickness however is not necessary. If desired, a thin coating of a dense mixture of white particles may be "flashed" on a body work of clear glass to produce which is known as flashed opal. Obviously, any material which may be produced in the form of a coating or as a sheet or plate and which comprises fine light-dispersive particles in suspension such as, for example, translucent porcelain, parchment, etc., may also be employed. The apparatus may be arranged so that the screen is observed either from the side toward the mirror or from the opposite side, but it will be understood that in totally enclosed compact instruments, the screen 15 will ordinarily form a portion of one of the walls of an enclosing case and the observations will be made from the side opposite the mirror 13.

In order to cause the spot of light to change in color as the magnitude of the measured quantity changes in value from one range of values to another, a series of color filters 20, 21 and 22 are provided between the mirror 13 and the translucent plate 18. These color filters may be arranged to cover successive portions of the surface of the plate 18. If desired, the translucent plate 18 may also have a scale 23 marked thereon.

Instruments constructed in accordance with my invention are obviously suitable for a wide range of applications where it is desirable that the deflecting element should follow variations in measured values quickly with high sensitivity and should also respond faithfully when the measured values fluctuate rapidly. However, the apparatus is particularly useful for making measurements when it is desired to determine whether or not the measured value falls within a given range of values, but it is not desired to take the time which would be required to read the exact scale values. Such a need may arise, for example, in connection with electric gauging devices where it is necessary to gauge rapidly a large number of objects without taking the time to take a scale reading for each gauging but obviously there are also numerous other applications in which my invention may be employed to advantage. However, for the sake of illustration, I have shown the instrument arranged for use with an electric gauging device 24 supplied by a suitable source of current 25 which is supplied to the instrument through the lines 26. The device 24 causes the resistance in the circuit to be varied, or in some other manner well understood in the art to cause the current flowing in lines 26 to vary with the position of the plunger 27. The plunger obviously varies in position with the thickness of the object 28 being tested for thickness. In utilizing the device, the objects intended to have uniform thicknesses are rapidly passed under the plunger 27 and the thicknesses are indicated by the position of the spot of light 17 on the scale 23. The boundaries between the successive color filters 20, 21 and 22 are so chosen that values within the permissible limits for the thickness of the object 28 will be indicated by scale positions covered by the color filter 21. Values below the permissible limits correspond to positions of the spot covered by color filter 22 and values above the permissible limit correspond to scale positions covered by the filter 20. The color filters 20, 21 and 22 may, for example, be arranged to pass only red, green and yellow light respectively. Accordingly, the operator can determine that the object is within the permissible limits if the spot shows up as green but must be rejected if the spot shows up either yellow or red. In this manner the tests can be made much more quickly since the operator can determine the color of the light spot more quickly and easily than he can observe the position of the spot with respect to the scale 23, or even with respect to lines 23' and 23" which might be drawn on scale 23 at the edges of the color filters to mark the permissible limits of the readings.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. An indicating instrument comprising a movable element carrying a mirror, a source of light and a translucent screen so arranged that a beam of light from said source is reflected by said mirror against said screen, said screen comprising an opal glass plate with a scale marked thereon cooperating with said light beam, and a plurality of color filters having different colors placed against the surface of said glass plate toward said beam of light, thereby producing a spot of light on said screen which varies in color as the deflection of the movable element deflects the light spot from one portion of the screen to another.

2. An indicating instrument comprising a movable element carrying a mirror, a translucent screen composed of opal glass having a scale marked thereon, a source of light arranged to produce a beam of light following a path from said source to said mirror and from said mirror to said screen so as to cooperate with the scale on said screen, a color filter interposed in the path of said light beam serving to produce a colored spot of light on said screen visible from any angle.

3. An indicating measuring instrument comprising a movable element carrying a mirror, a translucent screen composed of a material containing light-dispersive particles in suspension, means for causing a beam of light to be reflected from said mirror at an angle dependent upon the position of said movable element and to strike said screen at a point on said screen dependent upon the position of the movable element, a plurality of color filters placed in different portions of the angular space between said mirror and said screen so that each of said filters intercepts the light beam for only a given range of angular positions of the beam, said range being different for each of said color filters, thereby producing a spot of light on said screen which is visible from any angle and which has different characteristic colors for various ranges of values of measured quantities.

4. An indicating instrument comprising a movable element carrying a mirror, a translucent screen composed of a material containing light-dispersive particles in suspension and having a scale marked thereon, means for projecting a luminous image upon said screen by means of rays of light reflected from said mirror, said image being caused to travel along the scale on said screen with deflections in said movable element, and a plurality of color filters having different colors interposed between different portions of said screen and said mirror so as to cause the image projected on said screen to change in color with predetermined variations in the deflection of said movable element.

5. An indicating measuring instrument comprising a movable element carrying a mirror, a translucent screen, a source of light arranged to produce a beam of light following a path from said source to said mirror and from said mirror to said screen, said screen comprising an opal glass plate and a plurality of color filters having different colors placed against different portions of the surface of said opal glass plate towards said beam of light, thereby producing a spot of light on said screen which has different characteristic colors for various ranges of values of measured quantities.

6. An indicating instrument comprising a movable element carrying a mirror, a translucent screen composed of a material containing light dispersive particles in suspension, means for causing a beam of light to be reflected from said mirror to said screen, the angular position of said mirror consequently also the angular position of said reflected beam varying with variations in the magnitude of the quantity being measured, and a color filter intersecting the plane defined by the positions of the beam of light as the movable element is deflected, said color filter comprising a plurality of strips having successively different colors and being successively adjacent, thereby causing said light beam to produce spots of light on said screen which vary in color as the magnitude of the measured quantity passes through successive ranges of values.

7. A measuring instrument comprising a movable element carrying a mirror, a translucent screen, means for causing a beam of light to be reflected from said mirror to said screen, said beam of light changing in angular position with variations in magnitude of the measured quantity, said translucent screen comprising a plate of opal glass and a plurality of color filters having different colors covering successively adjacent portions of the surface of said glass plate towards said beam of light, thereby causing the light beam to produce a spot of light on said screen which moves across the screen and varies in color as the magnitude of the measured quantity passes through successive ranges of values.

8. A measuring instrument comprising a movable element carrying a mirror, a translucent screen composed of a material containing light dispersive particles in suspension, means for causing a beam of light to be reflected from said mirror to said screen, said beam of light changing in angular position with variations in magnitude of the measured quantity, and a color filter intersecting a portion of the plane swept through by said beam of light in response to variations in the measured quantity, thereby producing a spot of light on said screen which has a characteristic color for a range of values of the measured quantity corresponding to the angular range intersected by said color screen.

In witness whereof, I have hereunto set my hand.

FREDRICK S. MARCELLUS.